United States Patent [19]

Levin

[11] 4,100,398
[45] Jul. 11, 1978

[54] LAMINATED ELECTRICALLY HEATABLE WINDOW WITH ELECTRICAL CONNECTORS

[75] Inventor: Berton P. Levin, Santa Monica, Calif.

[73] Assignee: The Sierracin Corporation, Sylmar, Calif.

[21] Appl. No.: 790,042

[22] Filed: Apr. 22, 1977

Related U.S. Application Data

[62] Division of Ser. No. 608,091, Aug. 27, 1975, Pat. No. 4,029,942.

[51] Int. Cl.² ............................................. H05B 3/06
[52] U.S. Cl. ................................... 219/541; 219/543; 219/345; 174/68.5; 338/274
[58] Field of Search ............... 219/203, 345, 522, 528, 219/541, 543, 547; 428/49, 339, 411, 456; 174/68.5; 338/274, 309; 339/60, 183, 211, DIG. 3

[56] References Cited

U.S. PATENT DOCUMENTS

| 2,625,640 | 1/1953 | Gaiser et al. | 219/522 |
|---|---|---|---|
| 3,113,284 | 12/1963 | Van Inthoudt | 338/274 |
| 3,166,371 | 1/1965 | Brown et al. | 339/60 R |
| 3,403,368 | 9/1968 | Scardina | 338/274 X |
| 3,790,752 | 2/1974 | Boaz et al. | 219/522 |
| 3,794,809 | 2/1974 | Beck et al. | 219/203 |
| 3,947,618 | 5/1976 | Gruss | 428/49 |
| 4,029,942 | 6/1977 | Levin | 219/522 |

FOREIGN PATENT DOCUMENTS

| 1,196,330 | 7/1965 | Fed. Rep. of Germany | 219/522 |
|---|---|---|---|
| 331,115 | 10/1935 | Italy | 219/522 |

*Primary Examiner*—J. V. Truhe
*Assistant Examiner*—M. Paschall
*Attorney, Agent, or Firm*—Christie, Parker & Hale

[57] ABSTRACT

A laminated electrically heatable window has a transparent electrically conductive layer embedded in the window to act as a sheet resistor, and conductive bus bars embedded in the window in contact with the resistive layer. A portion of each bus bar extends outside an edge of the window to a terminal connection for making electrical contact with a harness cable leading to an electric current source such as an automobile alternator. Each terminal connection comprises separate electrical contacts on the ends of the bus bar and the cable harness for forming a cooperating pin and socket connection normal to the bus bar. The electrical contacts are pressure fitted together and hermetically sealed from end-to-end in an electrically insulating, protective sleeve.

21 Claims, 6 Drawing Figures

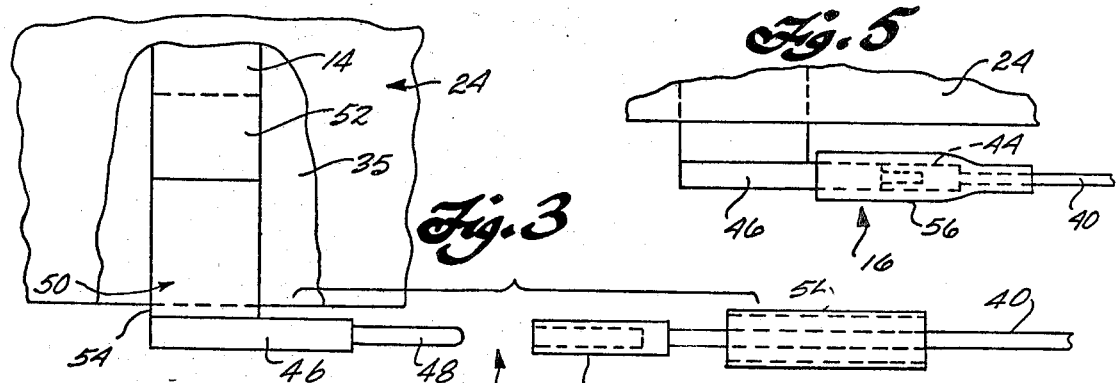
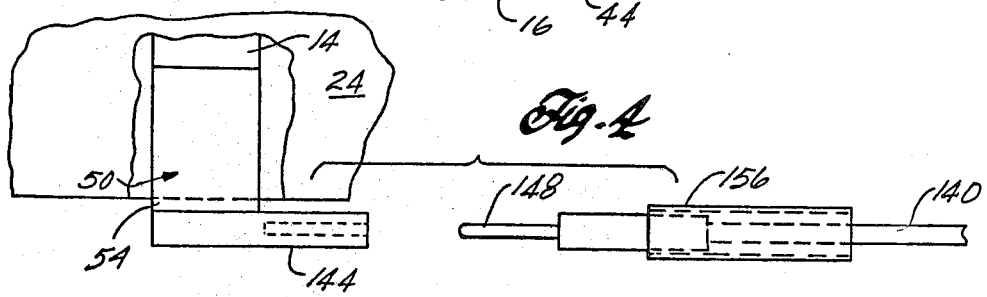
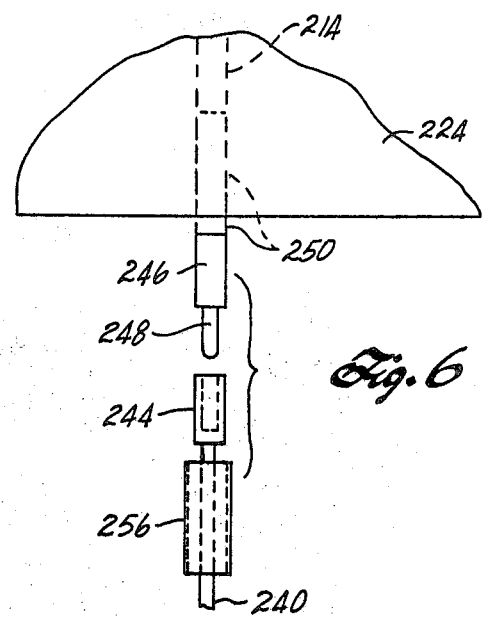

LAMINATED ELECTRICALLY HEATABLE WINDOW WITH ELECTRICAL CONNECTORS

CROSS REFERENCE TO RELATED APPLICATIONS

This is a division of application Ser. No. 608,091, filed Aug. 27, 1975, now U.S. Pat. No. 4,029,942.

BACKGROUND

This invention relates to laminated electrically heatable windows, and more particularly to an improved bus bar termination for making electrical contact between an electrically conductive layer in the window and a supply of electric current.

Recently, electrically heatable windows have been used for defrosting or defogging windshields and back windows of automobiles. One type of electrically heatable window includes a very thin conductive metal film on a carrier film of transparent plastic embedded in the window and extending over most of the area of the window. The metal film is so thin it is transparent to light, and when an electrical current is passing between its opposite edges, the metal acts as a sheet resistor. The metal film carries enough current to heat the windshield to inhibit condensation of fog or frost and remove accumulations of ice or snow.

Typically, the thin film of conductive metal is vacuum-deposited on a thin carrier film of plastic such as polyethylene terephthalate, commercially available as Du Pont's "Mylar". The carrier film is sandwiched between a pair of transparent sheets of interlayer material typically polyvinyl butyral which are, in turn, sandwiched between exterior face sheets of glass. Electrically conductive bus bars, typically made of thin copper foil, are laminated into the heatable window between the vacuum coated side of the carrier film and the adjacent interlayer so they are in electrical contact with the thin conductive film.

Electric current applied between the conductive bus bars along opposite edges of conductive areas within the window assures uniform heating over the area of the window. The ends of the conductive bus bars are typically extended beyond the edge of the window for making electrical connection to a harness cable leading to the automobile alternator for supplying electric current to the window. In a typical prior arrangement, the ends of the foil bus bars extending beyond the edge of the window are substantially completely embedded in a flat, projecting laminated tab comprising relatively thin face sheets of plastic. The tab has small exposed areas above each bus bar for providing electrical contact between the bus bars and the harness cable.

Such electrically heatable windows for automobiles are normally manufactured by initially forming a "prelaminate" which includes the conductive carrier film, the plastic interlayers heat-bonded to opposite sides of the carrier film, and the bus bars embedded between the interlayers and the conductive film. The prelaminates then undergo a laminating process in which face sheets of glass are applied to the opposite sides of the prelaminate. The glass typically is applied by evacuating excess air out of the laminate and applying heat and pressure, such as by infrared heating or in an autoclave or by use of nip rolls, to tackify the interlayers to aid in bonding them to the glass. Thereafter, the assembly is put into an autoclave where heat and pressure are applied by an oil medium to complete bonding the interlayers to the glass sheets. The end-product from the laminating process comprises the laminated electrically heatable window having terminal connections for the embedded bus bars extending from a corner of the window in the projecting plactic tab described above.

The window is then shipped to the automobile assembly plant where the window is installed in the automobile. The terminal contacts of the bus bars are then connected to a harness cable for supplying electric current to the window heating element from the automobile alternator or generator. Typically, the contact on the end of the harness cable is a relatively complicated fitting which includes spring metal electrical contacts encased in an electrically insulated housing having a hinged closure. The bus bar tab at the corner of the window is fitted into the housing so the exposed areas of the contacts overlie the bus bars. The closure is then snapped to a closed position over the tab to apply pressure for holding the bus bars against the electrical contacts in the fitting. The harness terminals may be applied at the windshield laminating plant and shipped pre-assembled to the assembly plant.

It is important that the connection between the harness cable and the bus bar leads be in a waterproof seal, because this terminal connection, when installed in the automobile, is normally on the weather-side of the automobile firewall. The harness cable fitting described above relies on a sealing gasket and may be only partially waterproof.

It is also desirable for the bus bar termination to satisfy such requirements as (1) low cost, (2) good electrical contact after being subjected to the laminating process, (3) simplicity of attachment to the electrical cable harness, (4) minimal autoclave oil penetration which would disrupt the electrical contact, (5) adequate "pull" strength to resist tearing or separation of the bus bars, and (6) permitting the connector joint to be extended a substantial distance from the windshield, if desired. The harness cable fitting described above has adequate pull strength, but only partially satisfies these other requirements.

The present invention provides an improved bus bar termination which is completely waterproof and also meets all the requirements enumerated above.

SUMMARY

Briefly, a preferred embodiment of the present invention includes a bus bar termination for a laminated electrically heatable window in which the window includes an electric resistive element embedded in the window, and an electrically conductive bus bar lead extending from an edge of the window. The bus bar lead is electrically connected to a cable for conducting electrical current to the resistive element of the window. When using the window in automobiles, the cable can be the harness cable leading from the alternator or generator. Each bus bar termination includes separate electrical contacts on the ends of the bus bar lead and the harness cable for forming a cooperating pin and socket connection. An electrically insulating protective sleeve is sealed around the cooperating pin and socket connection to make a hermetically sealed, completely waterproof enclosure for the electrical contact.

The bus bar termination of this invention permits quick, low labor content assembly of the cable and bus bar contacts. The cooperating pin and socket can be easily fitted together in a pressure fit which makes a reliable connection. In a preferred form of the invention, the protective sleeve is an initially loose-fitting section of a heat shrinkable tubing. After the pin and socket are connected, the heat shrinkable tubing is slipped over the connection and heat treated so it shrinks to a tight hermetic seal around the connection. When using the window in automobiles, the steps of connecting the contacts and heat-shrinking the protective sleeve can be performed after final lamination by the glass laminator, so that finished windows can be stored and then shipped to the automobile assembly plants with the harness cables attached. Windows using this bus bar termination can be completely inspected for electrical integrity before sealing the contact, so that rejects from the glass laminating processing do not include the cost of electrical terminal parts and the labor for connecting them. Prelaminates are also similarly readily inspected.

DRAWINGS

These and other aspects of the invention will be more fully understood by referring to the following detailed description and the accompanying drawings in which:

FIG. 3 is a fragmentary, partly exploded, plan view enlarged to show the portion of the bus bar termination within the circle 3 of FIG. 1;

FIG. 4 is a fragmentary, partly exploded plan view, partly broken away, illustrating an alternate embodiment of electrical termination;

FIG. 5 is a fragmentary plan view illustrating the completed bus bar termination after the components of FIG. 3 are assembled and sealed; and FIG. 6 is a fragmentary, partly exploded plan view, illustrating a further alternate embodiment of the electrical termination.

DETAILED DESCRIPTION

Figure 1:
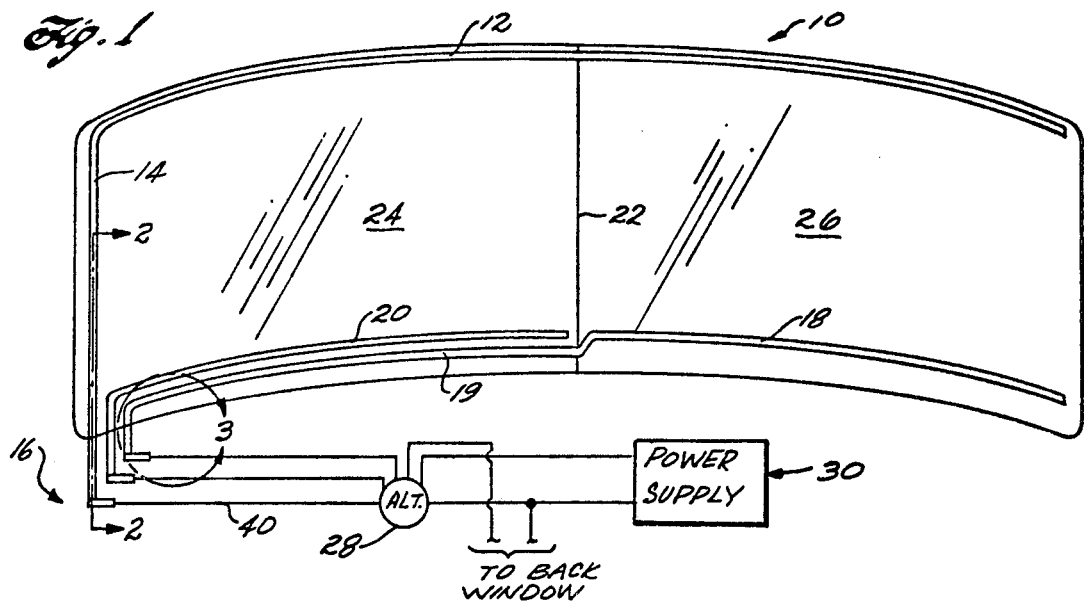
FIG. 1 is a schematic view showing a typical laminated electrically heatable windshield constructed in accordance with principles of this invention.

FIG. 1 illustrates a typical electrically heatable automobile windshield 10 constructed according to the principles of this invention. The windshield is transparent throughout most of its area and includes an electrically conductive or resistive layer of vacuum-deposited metal embedded in it for electrically heating the window to remove ice or frost, for example. The conductive layer of metal is sufficiently thin to be transparent. The invention also is useful with other types of conductive layers in the windshield, such as metal oxide, fine conductive wire, or frit type resistive elements.

A thin generally planar and relatively flexible elongated copper foil bus bar 12, such as one made according to the disclosure in U.S. Pat. No. 3,612,745, extends along the upper edge of the windshield. The bus bar 12 is embedded in the window at a location just slightly inboard the top edge of the window, and the bus bar extends substantially the entire width of the window. A lead portion 14 of the bus bar 12 extends down along one edge of the window. The lead portion 14 of the bus bar 12 includes a terminal portion 16 which extends beyond the bottom edge of the window and is shown in greater detail in FIGS. 2 and 3. The extension beyond the glass edge is exaggerated for clarity in these figures. In practice the bus bar termination is almost adjacent the glass edge. The bus bar and its exterior terminal portion can be a continuous conductive strip, or the terminal portion of the bus bar can be a separate conductive tab, such as that described in greater detail below.

A second bus bar 18 extends along the bottom edge of the window and terminates in an electrical terminal identical in construction to terminal 16, which also extends beyond the bottom edge of the window. The bus bar 18 makes a slight downward jog at the mid-line of the window to form a lower extension 19 extending half-way across the window. A third bus bar 20 extending approximately half-way across the window is embedded along the lower edge of the window immediately above the lower extension 19 of the bus bar 18. The third bus bar 20 also has an electrical terminal lead extending beyond the bottom edge of the window which is identical in construction to the terminal leads for the other two bus bars. The bus bars make electrical contact to the conductive layer. There is no electrical continuity between the parallel sections of bus bars 19 and 20.

An electrical isolation line 22 extends vertically across the window and divides the embedded conductive film into two conductive areas 24 and 26. The electrical isolation line is an extremely fine scribe line which interrupts the electrically conductive film in the window, and typically this line is almost invisible. Additional isolation lines (not shown) may be provided between adjacent bus bars and along the leads to the bus bars for limiting current flow between the bus bars.

During operation of the electrically heatable window, current is passed between the first bus bar 12 and the lower bus bar 20 for heating the resistive area 24. Current is separately passed between the top bus bar 12 and the portion of the second lower bus bar 18 beyond the end of the shorter lower bus bar 20 for electrically heating the second resistive area 26 of the windshield. Typically, the current through the two conductive areas 24 and 26 is applied in two phases from a three phase alternator 28 which distributes electric current in a circuit which includes a power supply 30, such as the automobile storage battery. The third phase is typically applied to the back window of the automobile. Other power sources may be D.C. or single phase A.C. and require corresponding changes in the bus bar configuration, with the elimination of the isolation line 22. If a three phase power source is used for the windshield only, then two such isolation lines would be present and would divide the windshield into three approximately equal areas with appropriate reconfiguration of the bus bars.

Figure 2:
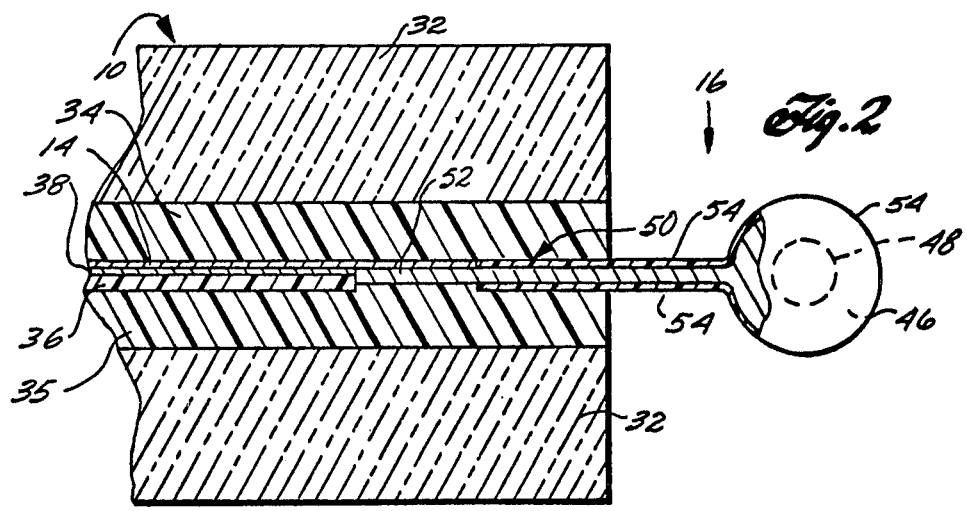
FIG. 2 is a fragmentary schematic cross-section elevation view taken on line 2—2 of FIG. 1 and showing a detail of the bus bar termination of this invention, this view being greatly exaggerated and having some elements proportionately different in size from their actual size for the purpose of clarity.

FIG. 2 illustrates the detailed construction of the electrical termination 16 for transmitting electric current to the resistive areas of the windshield. The windshield 10 has two exterior face plies 32 of glass. A pair of transparent plastic interlayers 34 and 35, preferably made of polyvinyl butyral, are bonded to and between the sheets of glass. A carrier film 36 of transparent plastic such as polyethylene terephthalate is sandwiched between the interlayers 34 and 35 over most of the area of the window and is bonded to both interlayers. The carrier film 36 has an extremely thin layer 38 of a conductive metal on at least one of its surfaces (shown greatly exaggerated in thickness in FIG. 2). The conductive metal layer 38 is applied to the carrier film 36 preferably by vacuum deposition techniques. The interlayers 34 and 35 typically are bonded to the metal coated surface of the carrier film, or to the carrier film itself, by conventional heat and pressure lamination in a manner well known in the art and referred to in U.S. Pat. No. 3,718,535.

Typically, a prelaminate comprising the interlayers 34 and 35 and the sandwiched carrier film 36 and conductive layer 38 are made by subjecting the prelaminate to pressures of from 150 to 200 psi at elevated temperatures, say 200° F., for approximately 2 hours. The prelaminate also includes the bus bars 12, 14, 18, 19 and 20 sandwiched between the carrier film 36 and the prelaminate 34 overlying the carrier film so that one side of each bus bar is in direct electrical contact with the conductive metal layer 38, and the other side of each bus bar is bonded to the adjacent interlayer 34.

FIGS. 2 and 3 illustrate one embodiment of a bus bar termination according to this invention. The end portions of the bus bar extensions 14, 19 and 20 extend to a lower corner of the windshield 10, as shown in FIG. 1, and then extend beyond the bottom edge of the windshield to provide terminal connections for electrically connecting the bus bars to an electric harness cable 40 which conducts electric current to the resistive elements of the windshield. Typically, the harness cable 40 can be a conventional insulated conductor wire extending from the terminal connection of the bus bars to a junction box (not shown) in the automobile. Connections to the junction box then lead to the three-phase power source.

The terminal end of the harness cable 40 includes a tubular receptacle clip 44 or socket (preferably about 1/16 inch I.D. by ½ inch long) electrically connected to the end of the harness cable. As shown in FIG. 3, the longitudinal axis of the tubular receptacle 44 is collinear with the longitudinal axis of the cable 40. The terminal connection 16 also includes a male electrical contact which comprises an elongated cylindrical-shaped solid metal shank 46 having a male end pin 48 of smaller diameter which is sized for a snug reliable pressure fit into the receptacle tube 44. The solid cylindrical shank portion 46 of the male end pin has an outside diameter which matches the outside diameter of the receptacle 44.

Preferably, the shank 46 of the male end pin is attached to, or continuous with, a conductive metal tab 50 which is attached to the terminal portion of the bus bar 14 at its opposite end. As shown best in FIG. 2, a major portion of the conductive tab 50 is embedded in an edge portion of the window. The remaining portion of the conductive tab 50 extends outside the edge of the window for for connection to the male terminal contact pin. The embedded portion of the tab 50 includes a bare metal section 52 in electrical contact with the end of the bus bar 14, the two being attached by spot welding or soldering (not shown). The remaining embedded portion of the tab 50 and the portion of the tab which extends outside the edge of the window are coated with a layer 54 of suitable electrical insulator such as a baked-on ceramic or lacquer. The coated portion of the tab which is located immediately inboard the edge of the window is bonded to the top and bottom interlayers 34 and 35 to insure a waterproof vinyl seal against the tab 50. As shown best in FIG. 2, the area of the carrier film 36 coincident with the tab is precut away to form a void for receiving the tab to avoid a thickness build up between the sheets of glass. The outer surface of the cylindrical shank 46 also includes an outer coating of the electrically insulating material 54.

The conductive tab 50 is preferably a thin metal strip (the dimension typically being 0.005 inch in thickness by ¼ inch in width by 1 inch in length). The axis of the male electrical contact is preferably perpendicular to the long dimension of the tab 50 to minimize the projected length beyond the glass edge in order to facilitate final lamination of the windshield. This also enables easy manufacture by wrapping the flat tab around the shank 46 and soldering if the pin, shank and flat strip are not formed integrally. Moreover, the connector on the end of the tab is located immediately adjacent the edge of the window, preferably being spaced from the window by a distance less that the diameter of the tab. This construction minimizes damage to the tab during the customary tacking by nip rollers prior to autoclave lamination. The male contact preferably is located so that a substantial portion of the length of the shank 46 extends beyond the edge of the tab 50 (typically the shank extends approximately ¼ inch away from the edge of the tab 50). The shank of the connector includes electrical insulation and the pin is bare.

The tab 50 is made from a material, such as phosphor bronze, or brass, having a greater strength and shear modulus than the bus bar. This construction provides good resistance to shear of the tab at the edge of the window when the terminal connection is subjected to pull in a direction which would tend to tear the exterior portion of the tab adjacent the edge of the window or prelaminate.

FIG. 4 shows an alternate form of the invention in which the male and female parts of the terminal connection shown in FIG. 3 are interchanged to form a connection in which a tubular electrical receptacle 144 is integral with the projecting end portion of the tab 50, and a male end pin 148 extends outwardly from the end of a harness cable 140 for supplying electric current to the resistive element of the window. In this form of the invention, the tubular socket 144 projects away from the edge of the tab 50 in a manner similar to the male connector shown in FIG. 3, and the male end pin 148 makes the same snug, reliable pressure fit in the socket 144.

The terminal contacts for the bus bar 20 and the bus bar extension 19 are constructed in a manner identical to that shown in FIGS. 3 and 4.

The prelaminate which includes the embedded bus bars also includes the projecting portions of the tabs 50 and the electrical contacts attached to the ends of the tabs, whether they be the male contact shown in FIG. 3, or the female contact shown in FIG. 4. As described above, these prelaminates are typically laminated with the face plies 32 of glass in a process which includes applying heat by an oil medium in an autoclave to bond the glass face plies to the plastic interlayers. After the laminated window is completed, the laminator then can assemble the bus bar terminal connections in the manner shown in FIGS. 3 or 4. The present invention allows these terminal connections to be assembled by inserting the male electrical pin into the female electrical socket to form a snug pressure fit. The contacts can be soldered after insertion if desired. The bus bar terminal connection shown in FIG. 3 also includes a loose-fitting protective sleeve 56 comprising a section of conventional heat shrinkable tubing which is slipped over the mating electric joint so that both the end of the electrical harness cable 40 and the projecting portion of the insulated shank 46 are covered by the tubing. The tubing is then heat treated so it shrinks to a tight hermetic seal around the opposite ends of the electrical connection. Since the diameters of the shank 46 and socket 44 are the same, a smooth connection is present on the inside of the heat shrink tubing. This assures secure electric insulation and a seal against weather. Further, the heat shrink tubing grips the connection to help prevent accidental dislodging making the harness cable essentially a permanent part of the window. The completed sealed connection is illustrated in FIG. 5.

Similarly, the terminal connection shown in FIG. 4 includes a loose-fitting, heat-shrinkable protective sleeve 156 which is slipped over the mating electrical joint so the projecting portion of the receptacle 144 and the end of the cable 140 are covered. The sleeve is then heat treated so it forms a tight hermetic seal around the electrical connection.

FIG. 6 shows a further alternate form of the invention in which a terminal connection 246 extends collinear with the elongate extent of the tab 250 and the bus bar 214. In this form of the invention, as in the others described above for FIGS. 3 and 4, the bus bar 214 and tab 250 are in electrical contact with one another and embedded in the laminated electrically heatable window 224. The terminal connection 216 includes a male contact having a metal shank 246 and projecting male end pin 248. The shank 246 is connected to the end of the tab 250 so the male end pin 248 extends generally perpendicular to the edge of the window 224. In the form illustrated in FIG. 6, the longitudinal axis of the pin 248 is collinear with the longitudinal axes of the tab 250 and bus bar 214. The shank 246 is either soldered to the end of the tab 250 to form an electrical connection between the two, or the tab and shank can be formed integrally. The exterior portion of the tab 250 and the outer surface of the shank 246 are coated with an electrically insulative layer. A portion of the tab located inboard of the edge of the window also is coated with an electrically insulative material and is bonded to the top and bottom interlayers of the window 224 to provide a waterproof vinyl seal against the tab. The projecting male end pin 248 is bare and makes a pressure fit in the electrical receptacle 244 which is electrically connected to the end of the cable 240. The heat shrinkable sleeve 256 is then slipped over the terminal pin-and-socket connection and heat shrunk to hermetically seal the connection.

As in FIGS. 3 and 4 above, the male and female contacts of the terminal connection shown in FIG. 6 can be interchanged to form a connection in which the tubular electrical receptacle 244 is integral with the projecting end portion of the tab 250, and the male end pin 248 and shank 246 are connected to the end of the cable 240.

Thus, the invention allows the glass laminator to make up the electrical connections and hermetically seal them after final lamination, so that windshields which are shipped to the automobile assembly plants for further assembly can have the electrical harness cable attached to them. Windshields made with the electrical terminal contacts of this invention can be completely inspected before inserting and sealing the harness cable so that rejects from the laminating process do not include the cost and labor content of these items.

One important advantage of the embodiment shown in FIG. 3 is that the use of a solid metal male electrical contact at the end of the bus bar avoids the risk of damage from mechanical crushing during pre-autoclave tacking, or the receptacle filling with autoclave oil during lamination which would then require careful degreasing before a reliable electrical joint can be established.

The terminal connection of this invention is only a fraction of an inch from the edge of the window as compared with the prior tab that was 6 inches or more in length. It is lightweight and gives reliable connections without springs or pressure contacts. The cost of components is greatly lower than the prior flat tab or other termination means involving soldering and caulking, and installation costs are also reduced. The connector becomes integral with the window and the lead wires can be taken a considerable distance to a convenient terminal point for connection into the automobile's electrical system. In the prior tab the electrical system was essentially brought to the tab and the terminal point was near the window.

What is claimed is:

1. A laminated electrically heatable window comprising:
   a pair of transparent face plies,
   a transparent laminate between the face plies, the transparent laminate including an electrically resistive heating element,
   an electrically conductive lead in contact with the resistive element, a portion of the electrically conductive lead extending outside an edge of the face plies,
   an electrical cable for conducting electric current to the resistive element,
   first electrical connector means comprising a first electrical contact means on the end of the portion of the electrically conductive lead extending outside said edge of the face plies, and second electrical contact means on the end of the cable,
   the first and second electrical contact means being engageable as a cooperating electrically conductive pin-and-socket connection for conducting electric current to the resistive element, the electrical contact means including means cooperating to form an electrically insulated exterior surrounding the engaged pin-and-socket connection,
   means electrically insulating the portion of the electrical lead extending outside said edge of the face plies and at least a portion of the electrically conductive lead embedded between the face plies near said edge of the face plies,
   means forming a seal around the electrically insulated embedded portion of the electrically conductive lead, and
   second electrical connector means for making electrical contact with said electrically resistive heating element.

2. The combination according to claim 1 including an electrically insulating sleeve encasing the electrically insulated exterior formed by the cooperating first and second electrical contact means to form a hermetic seal around the engaged contacts.

3. The combination according to claim 1 in which the electrically conductive lead comprises a flat, sheet-like conductor.

4. The combination according to claim 3 in which the first and second electrical contact means are arranged on the electrically conductive lead and on the cable, respectively, so the cooperating pin-and-socket connection projects away from the electrically conductive lead and extends substantially parallel to said edge of the face plies.

5. The combination according to claim 1 in which the first and second electrical contact means are arranged on the electrically conductive lead and on the cable, respectively, so the cooperating pin-and-socket connection projects away from the electrically conductive lead and extends substantially parallel to said edge of the face plies.

6. The combination according to claim 1 in which the electrically resistive heating element includes an embedded carrier having an electrically conductive element in contact with the electrically conductive lead; and including a cut-away portion of the carrier adjacent said edge of the face plies, a portion of the electrical lead being disposed in the cut-away portion of the carrier.

7. The combination according to claim 6 in which the portion of the transparent laminate in which the electrically conductive lead is embedded comprises plastic interlayers on opposite sides of the embedded conductive lead; and in which the portion of the electrically conductive lead in the cut-away section of the carrier comprises a separate conductive tab in electrical contact with the embedded resistive heating element and having a portion thereof projecting outside said edge of the face plies; and including a layer of electrical insulation on the portion of the tab located in said cut-away section, the interlayers being bonded to the insulated portion of the tab.

8. The combination according to claim 1 in which the first electrical contact means includes an elongated electrical pin, and the second electrical contact means includes an electrical socket for receiving the pin in a pressure fit to form an electrical connection.

9. The combination according to claim 8 in which the first and second electrical contact means are arranged on the electrically conductive lead and on the cable, respectively, so the cooperating pin-and-socket connection projects away from the electrically conductive lead and extends substantially parallel to said edge of the face plies.

10. The combination according to claim 9 in which the first electrical contact means extends normal to the length of the electrically conductive lead and includes an elongated shank having an electrically insulative exterior projecting away from the conductive lead, an electrically conductive pin on the end of the shank remote from the electrically conductive lead for engagement with the socket on the end of the cable.

11. The combination according to claim 2 in which the socket is collinear with the axis of the cable, and in which the electrically insulating sleeve is sealed around the socket.

12. The combination according to claim 11 in which the electrically insulating sleeve comprises a heat-shrinkable material having a loose fit around the cooperating pin-and-socket connection during assembly, and a tight sealing fit after heat shrinking.

13. The combination according to claim 11 in which the shank portion of the connector on the electrically conductive lead and the socket connector on the cable have outside diameters of substantially the same size.

14. The combination according to claim 1 including an electrically insulating sleeve for encasing the electrically insulated exterior formed by the cooperating first and second electrical contact means to form a hermetic seal around the engaged contacts, and in which the electrically insulating sleeve comprises a heat shrinkable material having a loose fit around the cooperating pin-and-socket connection during assembly, and a tight sealing fit after heat shrinking.

15. The combination according to claim 1 in which the portion of the transparent laminate in which the electrically conductive lead is embedded comprises plastic interlayers on opposite sides of the embedded insulated portion of the electrically conductive lead; the interlayers being bonded to the embedded insulated portion of the electrically conductive lead.

16. The combination according to claim 1 in which the electrical connection formed by the cooperating electrical contacts is spaced from said edge of the face plies by a distance less than about the width of the electrically conductive lead.

17. The combination according to claim 1 in which the electrically conductive contacts are arranged on the electrical lead and on the cable so the cooperating pin-and-socket connection extends in a direction generally parallel to the elongate extent of the electrically conductive lead.

18. The combination according to claim 7 in which the conductive tab has a higher strength and shear modulus than the electrically conductive lead.

19. The combination according to claim 1 in which the embedded portion of the electrically conductive lead comprises a bus bar in electrical contact with the resistive heating element, and a conductive tab in contact with the bus bar, a portion of the tab projecting outside said edge of the face plies; and in which the conductive tab has a strength and shear modulus greater than the bus bar.

20. The combination according to claim 1 including an electrically insulating sleeve encasing the electrically insulated exterior formed by the cooperating first and second electrical contact means to form a hermetic seal around the engaged contacts; in which the first and second electrical contact means are engaged to form said electrically conductive connection; and in which the electrically insulated exterior formed by the engaged first and second electrical contact means in sealed in the electrically insulating sleeve.

21. The combination according to claim 20 in which the electrically insulating sleeve comprises a heat-shrinkable material having a loose fit around the cooperating pin-and-socket connection durin assembly, and a tight sealing fit after heat shrinking.

* * * * *